United States Patent [19]

Brewer et al.

[11] 4,299,403
[45] Nov. 10, 1981

[54] WHEELED CARRIER FOR HAND LUGGAGE AND THE LIKE

[75] Inventors: William R. Brewer, Arleta, Calif.; Hamilton C. de Jong, 254 S. Berkeley Ave., Pasadena, Calif. 91107

[73] Assignee: Hamilton C. de Jong, Pasadena, Calif.

[21] Appl. No.: 92,654

[22] Filed: Nov. 9, 1979

[51] Int. Cl.³ .............................................. B62B 1/00
[52] U.S. Cl. ................................. 280/47.29; 280/655
[58] Field of Search ................... 280/652, 655, 47.29, 280/47.27, 47.24, 47.17, 639, 638

[56] References Cited

U.S. PATENT DOCUMENTS

| 3,947,054 | 3/1976 | Hall | 280/47.29 X |
| 4,062,565 | 12/1977 | Holtz | 280/47.37 R X |
| 4,185,848 | 1/1980 | Holtz | 280/655 X |

FOREIGN PATENT DOCUMENTS

| 742597 | 9/1966 | Canada | 280/47.27 |
| 2407848 | 7/1979 | France | 280/655 |
| 794439 | 5/1958 | United Kingdom | 280/47.27 |
| 2019789 | 11/1979 | United Kingdom | 280/47.24 |

Primary Examiner—Joseph F. Peters, Jr.
Assistant Examiner—D. W. Underwood
Attorney, Agent, or Firm—Charlton M. Lewis

[57] ABSTRACT

The present baggage carrier frame, comprising two foldable sections of truss-like configuration with a foldable platform at the lower end, provides enhanced frame stiffness with minimum increase of weight. The positive locking mechanism for holding the sections in operating relation is incorporated in the truss-like structure and effectively resists bending in either direction. Release of the lock is facilitated by tapering form of the upper frame section. The lower frame section includes rigis foot structure which performs the dual function of holding the carrier erect in loading position and supporting the platform member in traveling position. Further structural features are described which promote the effective operation and economical fabrication of the luggage carrier.

8 Claims, 8 Drawing Figures

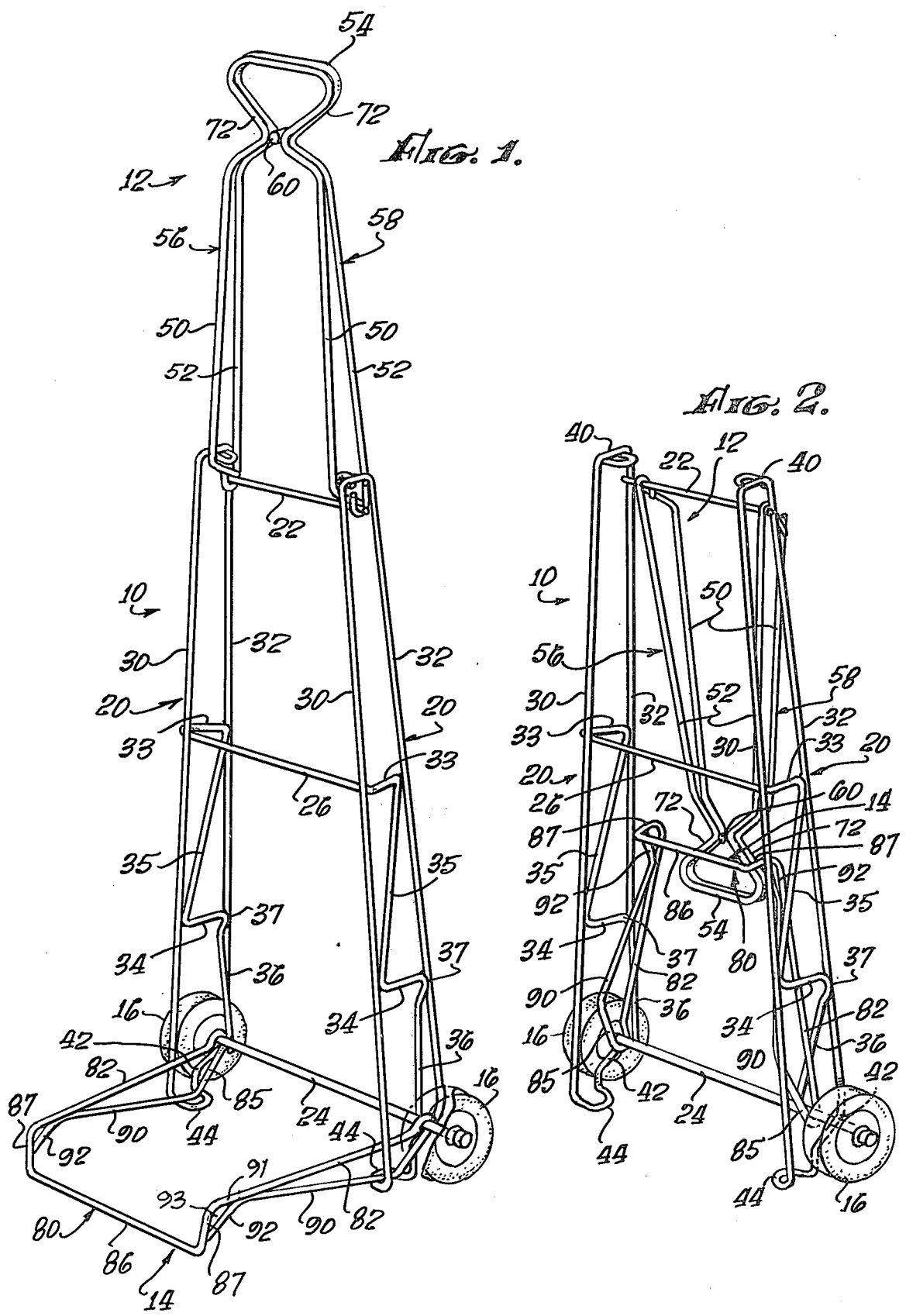

U.S. Patent  Nov. 10, 1981  Sheet 2 of 2  4,299,403
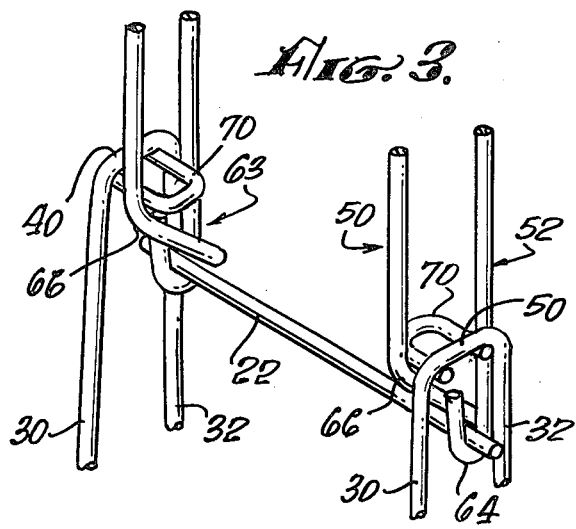
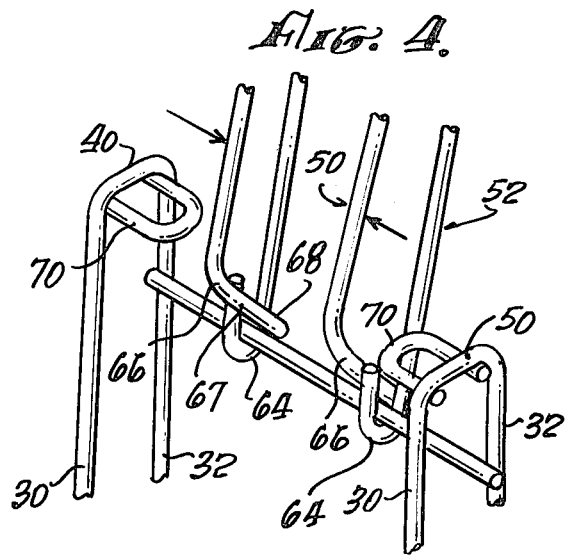
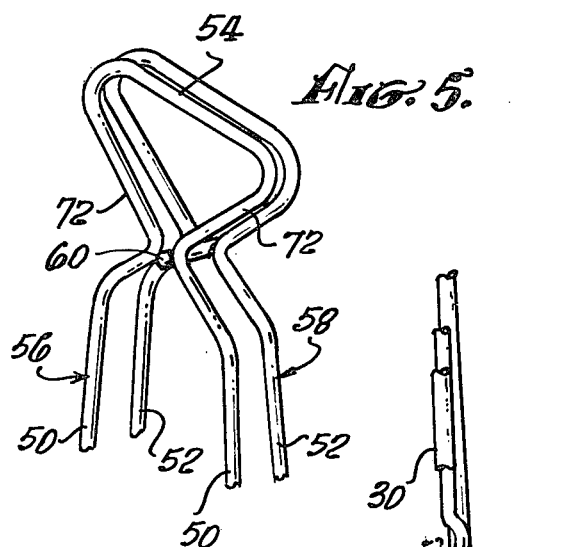
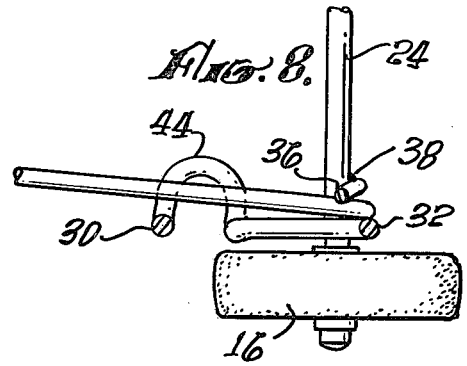
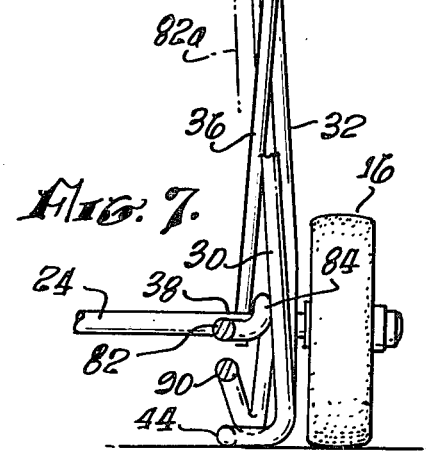
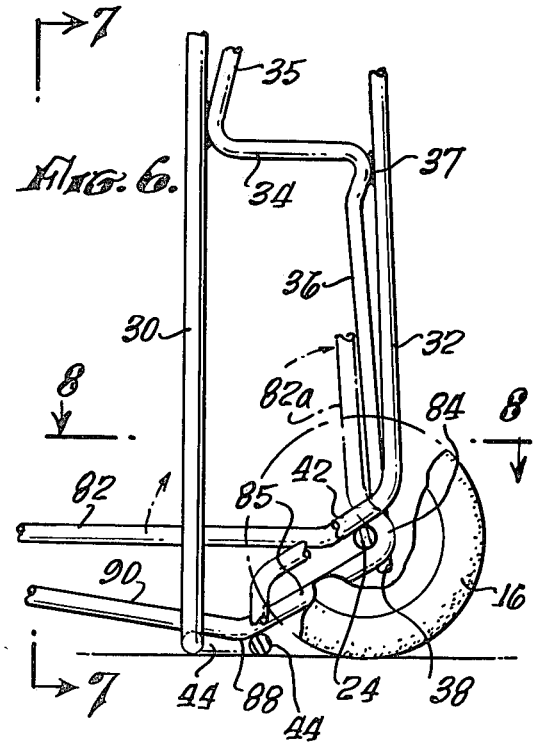

WHEELED CARRIER FOR HAND LUGGAGE AND THE LIKE

BACKGROUND OF THE INVENTION AND PRIOR ART

This invention concerns wheeled carriers for hand luggage and the like which are foldable for convenient storage and transportation when not in use.

The invention relates more particularly to luggage carriers, or caddies, of the general type which includes a flat elongated bed frame with a handle at one end and with a relatively short platform projecting at right angles at the other end. A pair of wheels are journaled on a wheel axis adjacent the intersection of the platform and frame. The bed frame is typically formed in two sections which can be folded into nesting relation, and the platform is foldable into coplanar relation with the main frame.

Such luggage caddies are commonly made of wire or light tubing and are intended to carry only relatively light loads, such as one or two suitcases of moderate size. Luggage caddies of that general type are described, for example, in U.S. Pat. No. 3,947,054 to Herbert Charles Hall and patent 4,062,565 to Gilbert J. Holtz.

An important object of the present invention is to provide a luggage caddy that is capable of handling relatively heavy and bulky loads, while retaining substantially the same convenience of manipulation and without significantly increasing the weight of the caddy itself.

The present applicants have found that a critical problem in such luggage caddies is the provision of sufficient strength in the relatively long bed frame, especially at the hinge coupling between its two frame sections. That hinge must be positively lockable in operating position with the two frame sections extending in a common plane. Moreover, the locking mechanism must be able to resist significant torques in both directions about the hinge axis.

In loading position of the caddy the bed frame is typically vertical, with the horizontal platform supported on a ground-engaging foot at its outer edge and by the caddy wheels. The luggage is typically loaded onto the horizontal platform with an edge of each piece of luggage contacting the forward face of the bed frame. The loaded caddy is rotated into traveling position by pulling the handle back, swinging the entire caddy about the wheel axis and lifting the platform clear of the ground. As the platform foot first leaves the ground, that action subjects the hinge lock to strong bending stress in a rearward direction.

In normal traveling position of the caddy the load is typically substantially balanced on the wheels, so that relatively little weight needs to be supported by the handle. However, in maneuvering the caddy the handle is occasionally lowered nearly to the ground. The bed frame then acts as a load-carrying beam supported by the handle at one end and by the wheels at the other end. The hinge lock is then subject to strong bending stress in a forward direction. Thus, the bed frame must have sufficient longitudinal stiffness, and the hinge lock must provide positive and fully reliable definition in both angular directions about the hinge axis. The present invention aims to provide improved frame and lock structure for meeting those conditions.

A further aspect of the present invention provides a luggage caddy that is capable of standing by itself with its bed frame vertical, both in loading position and with its platform and upper frame section folded.

The weight and the cost of fabrication of the present luggage caddy are minimized by designing many of the individual members or sections to perform more than one function. The number of parts and their total weight are thereby reduced.

Thus, for example, foot formations incorporated in the main lower frame structure not only hold the caddy in loading position, but also engage truss structure on the foldable platform, supporting the latter when the caddy is tipped rearwardly into traveling position.

Also, the truss-like structure of the upper frame is directly utilized to provide opposing abutments for the locking mechanism by which the two frame sections are positively but releasably locked in operating position. That lock mechanism is operated by relative compression of the resilient side members of the upper frame, somewhat as in the above identified patent to Holtz but without the duplication of cross members required in the Holtz structure and without exposing sharp hook formations when the frame is folded. Also, the present preferred structure facilitates operation of the lock by smoothly tapering the side members of the upper frame.

BRIEF DESCRIPTION OF THE DRAWING

A full understanding of the invention, and of its further objects and advantages, will be had from the following description of certain illustrative manners in which it may be carried out. The particulars of that description, and of the accompanying drawings which form a part of it, are intended only as illustration and not as a limitation upon the scope of the invention.

In the drawing:

FIG. 1 is a somewhat schematic perspective of an illustrative luggage caddy in accordance with the invention in loading position;

FIG. 2 is a corresponding perspective showing the luggage caddy in folded position;

FIG. 3 is a fragmentary perspective corresponding generally to a portion of FIG. 1 at enlarged scale and showing the hinge and locking mechanism in operating position;

FIG. 4 is a perspective corresponding to FIG. 3 with the locking mechanism released to permit folding of the frame;

FIG. 5 is a fragmentary perspective corresponding generally to the upper portion of FIG. 1 at enlarged scale;

FIG. 6 is a fragmentary side elevation of the luggage caddy of FIG. 1 at enlarged scale and partly broken away.

FIG. 7 is a section on line 7—7 of FIG. 6;

FIG. 8 is a section on line 8—8 of FIG. 6.

DESCRIPTION OF ILLUSTRATIVE FORM OF THE INVENTION

The illustrative luggage caddy shown in the present drawings comprises the main frame 10, the upper frame 12 and the platform 14. Main frame 10 includes the two side members 20, which are of truss-like construction. Those side members are connected by the rigid upper and lower cross members 22 and 24, respectively, and by the lighter intermediate cross member 26. Upper frame 12 is mounted on the main frame for pivotal movement about upper cross member 22 through an angle of about 180° between the operating position of FIG. 1 and the folded position of FIG. 2. Platform 14 is similarly swingable about lower cross member 24 through an angle of about 90° between the generally horizontal working position of FIG. 1 and the vertical folded position of FIG. 2. Lower cross member 24 projects laterally beyond each of the frame side members, forming stub shafts on which the two ground engaging wheels 16 are journaled.

In the normal loading position of the luggage caddy, frames 10 and 12 are coplanar, whereas platform 14 projects approximately perpendicularly from that plane. When folded, the platform and upper frame are compactly contained within the main frame. The unit can then be carried or packed conveniently, or rolled on wheels 16, which are still in operating position. The folded caddy will also stand erect on the wheels and the feet 44, to be more fully described. For clarity of description, the caddy will generally be assumed to be in the loading position of FIG. 1 unless otherwise indicated.

Each of the side members 20 of main frame 10 comprises the generally parallel front and rear beam elements 30 and 32, respectively. Front beam elements 30 lie in a common plane, which will be referred to as the bed plane, against which luggage is typically loaded. The beam elements of each pair are interconnected at their ends, and are further strengthened and stiffened by the intermediate diagonal struts 33 and 34 and the diagonal brace 35, forming a strong truss-like structure that resists flexure away from the bed plane. The upper beam ends and upper connection 40 between them form a sharply rectangular inverted U. The connection between the bottom ends of the beam elements includes an oblique section 42 adjacent rear beam 32, to which cross member 24 is typically welded (FIG. 6), and a section 44 of rounded U-form adjacent front beam 30. Those U-sections of both side members are folded laterally inward in a common plane tangent to wheels 16. The U-sections thus form feet which rest flatly on the ground when the caddy is vertical. The wheels and feet then form a stable support for the caddy, facilitating loading and allowing it to be stored conveniently in that position, whether folded or not.

The two beam elements 30 and 32 of each side member, with their end connections, are preferably formed of a single length of metal rod, bent to a closed figure and butt-welded. Struts 33 and 34 and brace 35 of both side members, as well as intermediate cross member 26 between those side members, are preferably all formed of a single length of metal rod, bent to the shape shown clearly in FIG. 1 and welded at each point of contact with the beam elements. The end portions of that rod form the further braces 36, which extend downward and laterally inward from the connection points 37. The lower ends of braces 36 are welded at 38 to lower cross member 24 (FIGS. 6, 7 and 8). Those brace sections 36 act as stiffening diagonal braces in the plane of FIG. 7, and also provide a positive stop for defining the folded position of platform 14, as will be more fully described below.

Upper frame 12 consists essentially of a transverse handle 54 and the legs 56 and 58 which extend downward from the respective ends of the handle, forming an elongated U. Each of the legs comprises two beam-like elements 50 and 52 which are generally parallel to each other and mutually spaced transversely of the plane of the U. The beam elements of each leg are effectively rigidly connected together near the handle and also at their lower ends, forming a truss-like structure that is stiff against flexure out of the U-plane. Additional cross connections between beam elements 50 and 52 may be provided if further stiffness is required.

In the present structure the upper connection between each pair of beam elements of the upper frame is made by welding both elements to the transverse stub rod 60. Corresponding definition of the spacing of the two beam elements at the free ends of the U legs is obtained by coupled structure 63 which also provides sliding pivot bearings for mounting the upper frame on cross member 22. As typically shown, the end of one beam element is curved to make the rounded hook 64, and the other beam element is bent nears its end at 66 so that the oblique end portion crosses both arms of hook 64. The elements are welded together at one or both the crossings 67 and 68, converting hook 64 into a closed loop. Despite its somewhat irregular shape, that loop provides a satisfactory bearing on cross member 22, especially if the inner radius of hook 64 corresponds to the cross sectional radius of that member. Thus the very simple structure just described provides both a sliding pivot bearing and an effectively rigid connection between the two beam elements 50 and 52 for holding their end portions at the desired mutual spacing.

That rigidly determined beam element spacing of the upper frame is utilized for locking the two frames in mutual operating position. In its preferred form, that locking mechanism requires, beyond the parts already described, only the two abutments 70. Those abutments are dimensioned to match the spacing between frame elements 50 and 52. They are rigidly mounted on the main frame and project laterally inward from the respective side members 20 of that frame at a level spaced typically one or two inches above upper cross member 22. As shown, each abutment 70 comprises a short section of metal rod of rounded U-shape with its legs welded to the frame side member, typically at the junctions of upper connection 40 and the respective beam elements 30 and 32. Cross member 22 is welded to one of the two beam members 30 or 32 at a selected distance below the locking abutments.

When that cross member is mounted on rear beam element 32, as in the present illustrative structure, coupling structure 63 of the upper frame is formed with hook 64 on the rear beam element 52. The described coupling structure then automatically positions the rear beam elements of the upper and lower frames in a common plane. And since, as previously described, the width of U-form abutments 70 matches both the spacing between upper beam elements 50 and 52 and the spacing of lower beam elements 30 and 32 at connection 40, the forward beam elements of the two frames are also positioned in a common plane.

In normal operating position of the luggage caddy, as in FIGS. 1 and 3, for example, the natural resilience of the upper frame maintains the free ends of frame legs 56 and 58 at opposite ends of cross member 22, with both abutments 70 gripped fittingly between members 50 and 52 of those legs. The abutments then act as latches to positively and accurately lock the main frame and upper frame in coplanar relation.

To fold the caddy, it is only necessary to flex the upper frame legs toward each other, thereby releasing latches 70 and permitting the upper frame to swing rearward about cross member 22, as in FIG. 4. After rotation through about 60° the legs can be allowed to spring apart again, and the upper frame will continue to swing down to its normal folded position of FIG. 2. That position is limited by the stop action of intermediate cross member 26. If desired, a spring detent or positive latch of any suitable type can be mounted on the latter member or in other suitable position for releasably retaining the upper frame in folded position. Reversal of that sequence returns the upper frame to operating position. Compression of the frame legs is required during only about the last third of the return rotation of the upper frame.

The manual force required for flexing the upper frame legs in operating the described latch depends upon the resilience of the frame material and upon the detailed design, both of which can be varied to obtain the desired performance. For example, the amplitude of flexing required for latch release can be considerably reduced, if desired, by reducing the lateral extension of U-shaped latches 70 inward from the respective side members; for example, the latches may be formed with more sharply squared corners. However, the rounded form shown has the advantage of tending to cam the two frames into alignment, thereby facilitating their return to operating position.

As a further example, the leg flexibility in the bed plane can be decreased conveniently by inserting a cross member linking the two legs together at a selected distance from handle 54. Such a link may be rigid or may have a selected degree of resilience so that it produces a relatively small increase in the effective stiffness of the legs.

In the presently preferred embodiment, represented in the drawings, a substantially rigid cross link between frame legs 56 and 58 is provided by forming the legs with opposing angular offsets or elbows 72 which nearly touch, and by employing a single common rod stub 60 for linking the two beam elements 50 and 52 of both legs. Such structure can be modified in many ways without changing its essential nature. For example, rod stub 60 can be replaced by a rod or other linking member of arbitrary length extending parallel to the plane of the frame with its ends welded between the beam elements 50 and 52 of the respective legs.

Elbows 72 are preferably designed so that the main leg sections are only two or three inches apart immediately below the elbows. The legs then diverge downward at a small angle and preferably along straight lines that are aligned with the side members of the lower frame. That general configuration has the advantage that the legs can readily be drawn toward each other, even against quite strong resilient opposition, to release them from abutments 70. A typical procedure is to grip handle 54 with one hand and then cup the other hand about legs 56 and 58 just below elbows 72 and slide it down the legs, camming them together. By such action, or by simply grasping the two arms at a point where they are normally suitably spaced and squeezing them together, the upper frame is fully under control for accurate manipulation during locking or unlocking of the two frames.

Platform 14 comprises a generally flat frame pivotally mounted on lower cross member 24 of the main frame. The preferred platform structure shown consists of a single length 80 of metal rod bent to form a sharply rectangular U. The web portion 86 of the U is offset from the plane of the two arms 82 by the short post sections 87, forming a ground-engaging foot. In loading position that foot supports the main part of the frame as a flat horizontal platform on which baggage can readily be loaded. Each arm 82 of the U has its end curved fittingly around member 24 to form the support bearing 84 (FIG. 6). Beyond the loop bearing, the rod returns obliquely downward at 85, forms an obtuse angle at 88, and then inclines upwardly at 90 and is welded to arm 82 at 91. Rod sections 85 and 90 thus form a supporting brace for reinforcing frame arm 82. Beyond weld 91, the short oblique section 92 abuts post 87, forming an eye 93 for connection of a strap or other lashing for the luggage.

Obtuse angle 88 of the platform brace is so designed that it nests in the cup-like foot formation 44 of the main frame. That foot thus acts as a stop to limit downward swinging movement of the platform and to support the platform in operating position when the main frame is tipped rearward on wheels 16 into traveling position. The support action of foot 44 is applied through brace 90 to each platform arm 82, enabling those arms to support remarkably heavy loads, especially during the critical operation of tipping the luggage carrier back from loading to traveling position. The cup form of each foot 44 has the further advantage of laterally enclosing angle 88 on its inward side so that it cannot slip off the foot by inward deflection of the brace.

In folded position, as in FIG. 2, the platform frame is fully enclosed by the main frame and thus occupies no additional space. The slight mutual angular inclination of arms 82 of the platform preferably corresponds to that of side members 20 of the main frame. In folded position each arm 82 is then parallel to the adjacent main frame side member, and can be closely spaced from the latter, as indicated in dot-dash lines at 82a in FIG. 7, thus maximizing the area of the platform.

The slightly diagonal angle of main frame braces 36 in the plane of FIG. 7 permits them to stiffen that frame and also to perform two additional functions: locating the axial position of each platform bearing 84 on cross member 24, as shown best in FIG. 7; and defining the angular position about cross member 24 of the platform in its folded position, shown at 82a in FIGS. 6 and 7. As shown in FIG. 6, bearings 84 are preferably so formed that platform side arms 82 lie in a common plane with cross member 24, while braces 36 lie in an adjacent parallel plane. Hence the angle at which the braces stop the swinging movement of the side arms at 82a is independent of the exact point of contact as viewed in FIG. 7.

We claim:

1. A foldable carrier for hand luggage and the like, comprising a main frame including two mutually spaced and generally parallel side members each of which includes generally parallel forward and rear beam elements mutually spaced transversely of the frame and interconnected to form a truss-like structure, upper and lower cross members interconnecting the side members, two ground engaging wheels journaled on the respective end portions of the lower cross member, an upper frame including a handle and pivotally mounted on the upper cross member, with means for releasably locking the upper and lower frames in coplanar working relation, said forward beam elements defining a bed plane and carrying at their lower ends respective laterally extending foot formations adapted with the wheels to support the main frame in a loading position with said bed plane substantially perpendicular, a platform frame comprising two side rails in a common plane, each pivoted at one end on said lower cross member for swinging movement of the platform frame between a folded position generally parallel to said bed plane and a working position transverse of the bed plane, support means at the other ends of the side rails for engaging the ground to hold the platform frame horizontal in said loading position of the main frame, oblique brace means rigidly mounted below each side rail for stiffening the same and including a support portion engageable with the upper face of the corresponding foot formation to support the platform frame in said working position when the main frame is inclined rearwardly for traveling, and a recess in the upper face of each said foot formation in position to receive said support portion of the brace means for stabilizing said brace means against lateral deflection.

2. A foldable carrier for hand luggage and the like, comprising a main frame including two mutually spaced and generally parallel side members each of which includes generally parallel forward and rear beam elements mutually spaced transversely of the frame and interconnected to form a truss-like structure, upper and lower cross members interconnecting the side members, two ground engaging wheels journaled on the respective end portions of the lower cross member, an upper frame including a handle and pivotally mounted on the upper cross member, with means for releasably locking the upper and lower frames in coplanar working relation, a platform frame comprising two side rails in a common plane, each pivoted at one end on said lower cross member for swinging movement of the platform frame between a folded position generally parallel to said bed plane and a working position transverse of the bed plane, an oblique brace rigidly joined to the rearward beam element of each said side member of the main frame and to said lower cross member at a point of the latter closely spaced inward of that beam element, each side rail of the platform frame being pivoted on the lower cross member at a position defined on one side by the rearward beam element and on the other side by the oblique brace, one the oblique brace forming a stop for engaging the side rail to define said folded position of the platform frame.

3. A foldable carrier for hand luggage and the like, comprising a main frame including two mutually spaced and generally parallel side members each of which includes generally parallel forward and rear beam elements mutually spaced transversely of the frame and interconnected to form a truss-like structure, upper and lower cross members interconnecting the side members, two ground engaging wheels journaled on the respective end portions of the lower cross member, and an upper frame including a handle and pivotally mounted on the upper cross member, with means for releasably locking the upper and lower frames in coplanar working relation, said upper frame comprising two side members each including a pair of generally parallel beam elements mutually spaced transversely of the frame, with means rigidly interconnecting the beam elements of each pair at their lower ends and forming a pivot bearing for said pivotal mounting of the upper frame, said bearings being slidable on the upper cross member of the main frame in response to lateral flexure of the side members of the upper frame, said frame locking means comprising a single inwardly projecting boss rigidly mounted on each of said side members of the main frame above the upper cross member, said bosses having such lateral width that they are fittingly receivable between the beam elements of the upper frame in response to outward resilient flexure of the upper frame side members when the two frames are in said coplanar working relation.

4. A foldable carrier for hand luggage and the like, comprising a main frame including two mutually spaced and generally parallel side members each of which includes generally parallel forward and rear beam elements mutually spaced transversely of the frame and interconnected to form a truss-like structure, upper and lower cross members interconnecting the side members, two ground engaging wheels journaled on the respective end portions of the lower cross member, and an upper frame including a handle and pivotally mounted on the upper cross member, with means for releasably locking the upper and lower frames in coplanar working relation, said upper frame comprising two leg members each supportingly connected at one end to said handle and slidingly pivoted at the other end on said upper cross member of the main frame, said leg members being relatively flexible in their common plane with their said other ends resiliently biased toward a normally wide spacing along said cross member, said locking means including means positively lockable in response to said wide spacing of the leg member ends and releasable in response to leg member flexure to reduce such spacing, the leg members including respective generally parallel grip sections mutually spaced closely enough to be both embraceable by a single hand, with cam sections adjoining said grip sections and normally diverging smoothly from each other at a small enough angle that an embracing hand may slide from the grip sections along the cam sections to cammingly flex the leg members toward each other to release the locking means.

5. In a foldable carrier for hand luggage and the like, the combination of an elongated main frame including two main side members which define a common bed plane and are connected together adjacent their lower ends by ground engaging wheel means and adjacent their upper ends by a single cross member, an elongated and generally flat upper frame which comprises two leg members interconnected at their upper ends and each including a pair of generally parallel beam elements mutually spaced transversely of the frame, means for interconnecting the lower ends of each pair of beam elements at a predetermined mutual spacing to form a truss-like configuration which is relatively flexible in the plane of the frame and relatively stiff against flexure out of that plane, said interconnecting means including means for slidably pivoting the lower end of each leg member on said cross member of the main frame, and means responsive to resilient flexure of the leg members for releasably locking the main frame and the upper frame in coplanar working relation, said locking means comprising a single inwardly projecting boss rigidly mounted on each of said side members above said cross member, said bosses having such lateral width as to be fittingly receivable between the beam elements of each pair when the frames are in said coplanar working relation.

6. Combination according to claim 5 wherein each said boss includes substantially parallel, oppositely facing edge portions which engage the respective beam elements of the associated leg member in locking condition of said locking means for insuring positive positive locking action, and generally rounded end portions for facilitating entry of the boss between beam elements.

7. Combination according to claim 5 wherein said interconnecting means comprise a rounded hook formation at the lower end of one beam element of each pair, and an obliquely bent portion at the lower end of the other beam element, which portion overlies and closes the corresponding hook formation to form a pivot bearing.

8. Combination according to claim 5 wherein said leg members include respective generally parallel grip sections mutually spaced closely enough to be both embraceable by a single hand, with cam sections adjoining said grip sections and normally diverging smoothly from each other at a small enough angle that an embracing hand may slide from the grip sections along the cam sections to cammingly flex the leg members toward each other to release the locking means.

* * * * *